(12) United States Patent
Wittkopp et al.

(10) Patent No.: US 7,905,809 B2
(45) Date of Patent: Mar. 15, 2011

(54) MULTI-SPEED TRANSMISSION

(75) Inventors: Scott H. Wittkopp, Ypsilanti, MI (US); Andrew W. Phillips, Rochester, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/871,555

(22) Filed: Aug. 30, 2010

(65) Prior Publication Data
US 2010/0323843 A1 Dec. 23, 2010

Related U.S. Application Data

(63) Continuation of application No. 11/950,463, filed on Dec. 5, 2007, now Pat. No. 7,798,932.

(60) Provisional application No. 60/916,439, filed on May 7, 2007.

(51) Int. Cl.
*F16H 3/44* (2006.01)

(52) U.S. Cl. .................. 475/269; 475/296

(58) Field of Classification Search .................. 475/269, 475/271, 275–292
See application file for complete search history.

(56) References Cited

U.S. PATENT DOCUMENTS

| | | |
|---|---|---|
| 6,176,803 B1 | 1/2001 | Meyer |
| 6,342,026 B1 | 1/2002 | Takagi |
| 6,547,688 B2 | 4/2003 | Takagi |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Lee et al. |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |
| 7,011,597 B2 | 3/2006 | Haka |
| 7,014,589 B2 | 3/2006 | Stevenson |
| 7,128,683 B2 | 10/2006 | Oguri |
| 7,163,484 B2 | 1/2007 | Klemen |
| 7,226,381 B2 | 6/2007 | Klemen |
| 7,637,837 B2 * | 12/2009 | Hart et al. ............ 475/269 |
| 2006/0019791 A1 | 1/2006 | Baldwin |
| 2006/0270514 A1 | 11/2006 | Oguri |
| 2006/0270516 A1 | 11/2006 | Klemen |
| 2008/0242481 A1 | 10/2008 | Phillips |
| 2008/0280723 A1 | 11/2008 | Wittkopp et al. |
| 2009/0054193 A1 * | 2/2009 | Carey et al. ........... 475/276 |

* cited by examiner

*Primary Examiner* — David D Le
*Assistant Examiner* — Derek D Knight

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches.

20 Claims, 2 Drawing Sheets

| GEAR STATE | GEAR RATIO | RATIO STEP | CLUTCHING ELEMENTS | | | | |
|---|---|---|---|---|---|---|---|
| | | | 32 | 28 | 30 | 26 | 34 |
| REV | -1.800 | | | X | | X | X |
| N | | -0.44 | | | | O | O |
| 1ST | 4.111 | | | | X | X | X |
| 2ND | 2.913 | 1.41 | X | | | X | X |
| 3RD | 1.947 | 1.50 | X | | X | | X |
| 4TH | 1.351 | 1.44 | X | X | | | X |
| 5TH | 1.000 | 1.35 | | X | X | | X |
| 6TH | 0.737 | 1.36 | X | X | X | | |
| 7TH | 0.643 | 1.15 | | X | X | X | |
| 8TH | 0.549 | 1.17 | X | X | | X | |

X = ON - CARRYING TORQUE
O = ON - NOT CARRYING TORQUE

FIG. 3

MULTI-SPEED TRANSMISSION

CROSS-REFERENCE TO RELATED APPLICATIONS

This patent application is a continuation of U.S. application Ser. No. 11/950,463 filed on Dec. 5, 2007 now U.S. Pat. No. 7,798,932, which claims the benefit of U.S. provisional Application No. 60/916,439 filed on May 7, 2007. The disclosures of the above applications are incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches.

An embodiment of the transmission includes an input member, an output member, and first, second, third and fourth planetary gear sets each having first, second and third members. A first interconnecting member continuously interconnects the third member of the first planetary gear set with the third member of the second planetary gear set. A second interconnecting member continuously interconnects the second member of the second planetary gear set with a stationary element. A third interconnecting member continuously interconnects the second member of the second planetary gear set with the first member of the first planetary gear set. A fourth interconnecting member continuously interconnects the first member of the third planetary gear set with the first member of the fourth planetary gear set. Five torque-transmitting mechanisms are selectively engageable to interconnect one of the first, second, and third members with another of the first, second, and third members. The torque-transmitting mechanisms are selectively engageable in combinations of at least three to establish at least eight forward speed ratios and at least one reverse speed ratio between the input member and the output member.

In one aspect of the embodiment of the present invention, a first of the five torque transmitting mechanisms is selectively engageable to interconnect the input member with the first member of the second planetary gear set.

In another aspect of the embodiment of the present invention, a second of the five torque transmitting mechanisms is selectively engageable to interconnect the third member of the first planetary gear set with the third member of the fourth planetary gear set.

In yet another aspect of the embodiment of the present invention, a third of the five torque transmitting mechanisms is selectively engageable to interconnect the second member of the first planetary gear set with the third member of the fourth planetary gear set.

In yet another aspect of the embodiment of the present invention, a fourth of the five torque transmitting mechanisms is selectively engageable to interconnect the third member of the first planetary gear set with the second member of the fourth planetary gear set.

In yet another aspect of the embodiment of the present invention, a fifth of the five torque transmitting mechanisms is selectively engageable to interconnect the second member of the fourth planetary gear set with the third member of the third planetary gear set.

In yet another aspect of the embodiment of the present invention, the input member is continuously interconnected with the second member of the third planetary gear set and the output member is continuously interconnected with the third member of the third planetary gear set.

In yet another aspect of the embodiment of the present invention, the five torque transmitting mechanisms are clutches.

In yet another aspect of the embodiment of the present invention, the first members are sun gears, the second members are carrier members, and the third members are ring gears.

Another embodiment of the transmission of the present invention includes an input member, an output member, first, second, third and fourth planetary gear sets each having first, second and third members, wherein the input member is continuously interconnected with the second member of the third planetary gear set and the output member is continuously interconnected with the third member of the third planetary gear set. A first interconnecting member continuously interconnects the third member of the first planetary gear set with the third member of the second planetary gear set. A second interconnecting member continuously interconnects the second member of the second planetary gear set with a stationary element. A third interconnecting member continuously interconnects the second member of the second planetary gear set with the first member of the first planetary gear set. A fourth interconnecting member continuously interconnects the first member of the third planetary gear set with the first member of the fourth planetary gear set. A first torque transmitting mechanism is selectively engageable to interconnect the input member with the first member of the second planetary gear set. A second torque transmitting mechanism is selectively engageable to interconnect the third member of the first planetary gear set with the third member of the fourth planetary gear set. A third torque transmitting mechanism is selectively engageable to interconnect the second member of the first planetary gear set with the third member of the fourth planetary gear set. A fourth torque transmitting mechanism is selectively engageable to interconnect the third member of the first planetary gear set with the second member of the fourth planetary gear set. A fifth torque transmitting mechanism is selectively engageable to interconnect the second member of the fourth planetary gear set with the third member of the third planetary gear set. The torque-transmitting mechanisms are selectively engageable in combinations of at least three to establish at least eight forward speed ratios and at least one reverse speed ratio between the input member and the output member.

In one aspect of the embodiment of the present invention, the torque transmitting mechanisms are clutches.

In another aspect of the embodiment of the present invention, the first members are sun gears, the second members are carrier members, and the third members are ring gears.

Another embodiment of the transmission of the present invention includes an input member, an output member, first, second, third and fourth planetary gear sets each having a sun gear member, a carrier member, and a ring gear member, wherein the input member is continuously interconnected with the carrier member of the third planetary gear set and the output member is continuously interconnected with the ring gear member of the third planetary gear set. A first interconnecting member continuously interconnects the ring gear member of the first planetary gear set with the ring gear member of the second planetary gear set. A second interconnecting member continuously interconnects the carrier member of the second planetary gear set with a stationary element. A third interconnecting member continuously interconnects the carrier member of the second planetary gear set with the sun gear member of the first planetary gear set. A fourth interconnecting member continuously interconnects the sun gear member of the third planetary gear set with the sun gear member of the fourth planetary gear set. A first torque transmitting mechanism is selectively engageable to interconnect the input member with the sun gear member of the second planetary gear set. A second torque transmitting mechanism is selectively engageable to interconnect the ring gear member of the first planetary gear set with the ring gear member of the fourth planetary gear set. A third torque transmitting mechanism is selectively engageable to interconnect the carrier member of the first planetary gear set with the ring gear member of the fourth planetary gear set. A fourth torque transmitting mechanism is selectively engageable to interconnect the ring gear member of the first planetary gear set with the carrier member of the fourth planetary gear set. A fifth torque transmitting mechanism is selectively engageable to interconnect the carrier member of the fourth planetary gear set with the ring gear member of the third planetary gear set. The torque-transmitting mechanisms are selectively engageable in combinations of at least three to establish at least eight forward speed ratios and at least one reverse speed ratio between the input member and the output member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting clutches in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to a ground. A first component or element of a second planetary gear set is also permanently coupled to a ground. A second component or element of the first planetary gear set is permanently coupled to a second component or element of the second planetary gear set. Finally, a second component or element of the third planetary gear set is permanently coupled to a second component or element of a fourth planetary gear set.

Figure 1:
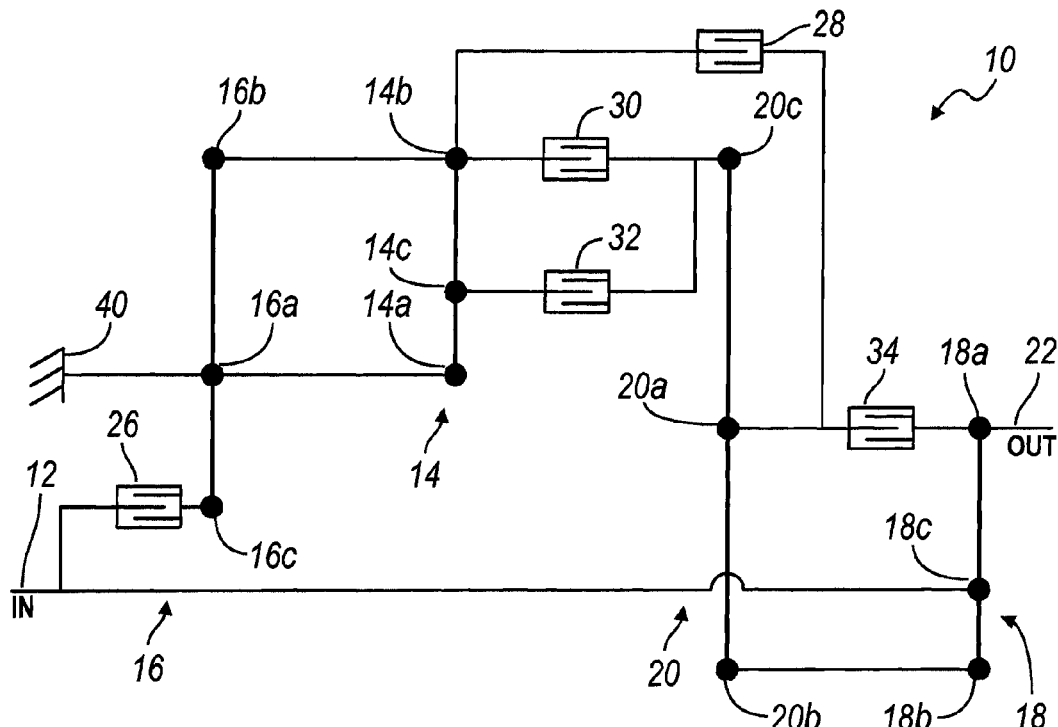
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms or devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the third node 18C of the third planetary gear set 18. The output member 22 is coupled to the first node 18A of the third planetary gear set 18. The first node 14A of the first planetary gear set 14 is coupled to a ground or transmission housing 40. The first node 16A of the second planetary gear set 16 is also coupled to the ground or transmission housing 40. The second node 14B of the first planetary gear set 14 is coupled to the second node 16B of the second planetary gear set 16. The second node 18B of the third planetary gear set 18 is coupled to the second node 20B of the fourth planetary gear set 20.

A first clutch 26 selectively connects the input member 12 to the third node 16C of the second planetary gear set 16. A second clutch 28 selectively connects the second node 14B of the first planetary gear set 14 to the first node 20A of the fourth planetary gear set 20. A third clutch 30 selectively connects the second node 14B of the first planetary gear set 14 to the third node 20C of the fourth planetary gear set 20. A fourth clutch 32 selectively connects the third node 14C of the first planetary gear set 14 to the third node 20C of the fourth planetary gear set 20. A fifth clutch 34 selectively connects the first node 20A of the fourth planetary gear set 20 to the first node 18A of the third planetary gear set 18.

Figure 2:
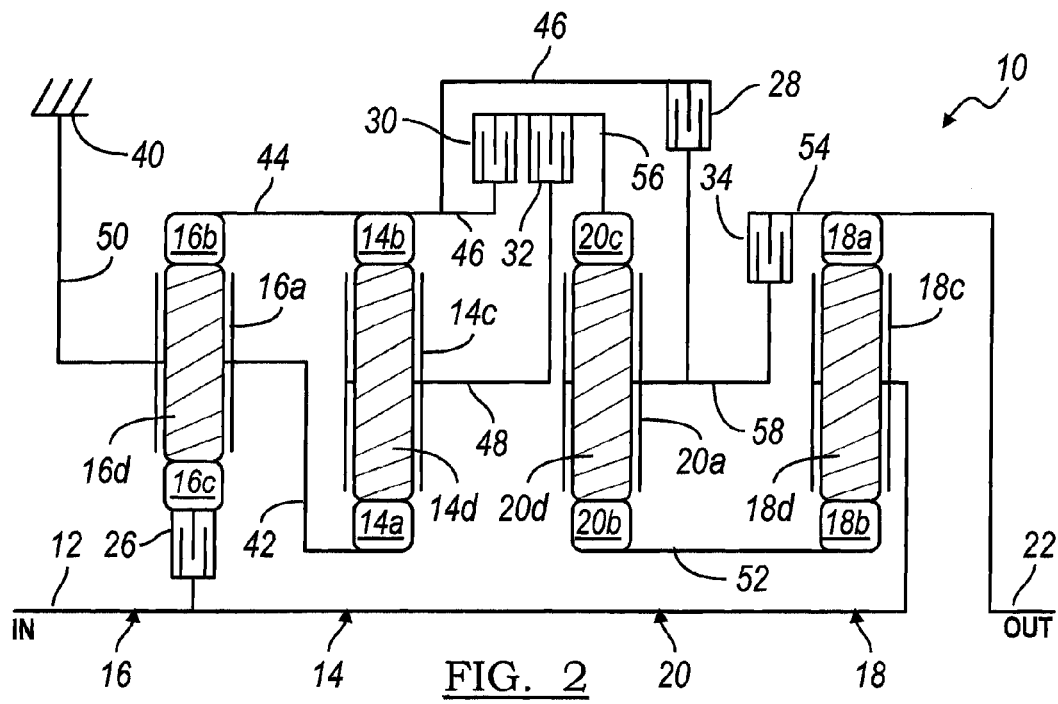
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 is a planetary gear set that includes a sun gear member 14A, a planet gear carrier member 14C and a ring gear member 14B. The sun gear member 14A is connected for common rotation with a first shaft or interconnecting member 42. The ring gear member 14B is connected to a second shaft or interconnecting member 44 and to a third shaft or interconnecting member 46. The planet gear carrier member 14C rotatably supports a set of planet gears 14D (only one shown) and is connected for common rotation with a fourth shaft or interconnecting member 48. The planet gears 14D are configured to intermesh with the sun gear member 14A and the ring gear member 14B.

The input shaft or member 12 is continuously connected to an engine (not shown) or to a turbine of a torque converter (not shown). The output shaft or member 22 is continuously connected with the final drive unit or transfer case (not shown).

The planetary gear set 16 is a planetary gear set that includes a sun gear member 16C, a planet carrier member 16A that rotatably supports a set of planet gears 16D and a ring gear member 16B. The sun gear member 16C is connected for common rotation with the first clutch 26. The planet carrier member 16A is connected to the ground or transmission housing 40 by a fifth shaft or interconnecting member 50 in order to restrict the planet carrier member 16A from rotating relative to the ground or transmission housing 40. The planet carrier member 16A is also connected for common rotation with the first interconnecting member 42. The ring gear member 16B is connected for common rotation with the second interconnecting member 44. The planet gears 16D are configured to intermesh with both the sun gear member 16C and the ring gear member 16B.

The planetary gear set 18 is a planetary gear set that includes a sun gear member 18B, a ring gear member 18A and a planet carrier member 18C that rotatably supports a set of planet gears 18D. The sun gear member 18B is connected for common rotation with a sixth shaft or interconnecting member 52. The ring gear member 18A is connected for common rotation with a seventh shaft or interconnecting member 54 and with the output member 22. The planet carrier member 18C is connected for common rotation with the input member 12. The planet gears 18D are configured to intermesh with both sun gear member 18B and ring gear member 18A.

The planetary gear set 20 is a planetary gear set that includes a sun gear member 20B, a ring gear member 20C and a planet carrier member 20A that rotatably supports a set of planet gears 20D. The sun gear member 20B is connected for common rotation with the sixth interconnecting member 52.

The ring gear member 20C is connected for common rotation with an eighth shaft or interconnecting member 56. The planet carrier member 20A is connected for common rotation with a ninth shaft or interconnecting member 58. The planet gears 20D are configured to intermesh with both the sun gear member 20B and the ring gear member 20C.

The torque-transmitting mechanisms or clutches 26, 28, 30, 32 and 34 allow for selective interconnection of the shafts or interconnecting members, members of the planetary gear sets and the housing. For example, the first clutch 26 is selectively engageable to connect the sun gear member 16C to the input member 12. The second clutch 28 is selectively engageable to connect the third interconnecting member 46 to the ninth interconnecting member 58. The third clutch 30 is selectively engageable to connect the third interconnecting member 46 to the eighth interconnecting member 56. The fourth clutch 32 is selectively engageable to connect the fourth interconnecting member 48 to the eighth interconnecting member 56. The fifth clutch 34 is selectively engageable to connect the seventh interconnecting member 54 to the ninth interconnecting member 58.

Referring now to FIGS. 2 and 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, and fifth clutch 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 26, the second clutch 28, and the fifth clutch 34 are engaged or activated. The first clutch 26 connects the second sun gear member 16C to the input member 12. The second clutch 28 connects the third interconnecting member 46 to the ninth interconnecting member 58. The fifth clutch 34 connects the seventh interconnecting member 54 to the ninth interconnecting member 58. Likewise, the eight forward ratios are achieved through different combinations of clutch engagement, as shown in FIG. 3.

It will be appreciated that the foregoing explanation of operation and gear states of the eight speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third, and fourth planetary gear sets each having first, second, and third members;
a first torque transmitting mechanism selectively engageable to interconnect the input member with the first member of the second planetary gear set;
a second torque transmitting mechanism selectively engageable to interconnect the third member of the fourth planetary gear set with at least one of the third member of the first planetary gear set and the third member of the second planetary gear set;
a third torque transmitting mechanism selectively engageable to interconnect the second member of the first planetary gear set with the third member of the fourth planetary gear set;
a fourth torque transmitting mechanism selectively engageable to interconnect the second member of the fourth planetary gear set with at least one of the third member of the first planetary gear set and the third member of the second planetary gear set; and
a fifth torque transmitting mechanism selectively engageable to interconnect the second member of the fourth planetary gear set with the third member of the third planetary gear set, and
wherein a plurality of combinations of two torque-transmitting mechanisms are disengaged to establish at least eight forward speed ratios and at least one reverse speed ratio between the input member and the output member.

2. The transmission of claim 1 wherein one of the at least one reverse speed ratios is achieved by engagement of the first, fourth, and fifth torque transmitting mechanisms.

3. The transmission of claim 2 wherein a first of the at least eight forward speed ratios is achieved by engagement of the first, second, and fifth torque transmitting mechanisms.

4. The transmission of claim 3 wherein a second of the at least eight forward speed ratios is achieved by engagement of the first, third, and fifth torque transmitting mechanisms.

5. The transmission of claim 4 wherein a third of the at least eight forward speed ratios is achieved by engagement of the second, third, and fifth torque transmitting mechanisms.

6. The transmission of claim 5 wherein a fourth of the at least eight forward speed ratios is achieved by engagement of the third, fourth, and fifth torque transmitting mechanisms.

7. The transmission of claim 6 wherein a fifth of the at least eight forward speed ratios is achieved by engagement of the second, fourth, and fifth torque transmitting mechanisms.

8. The transmission of claim 7 wherein a sixth of the at least eight forward speed ratios is achieved by engagement of the second, third, and fourth torque transmitting mechanisms.

9. The transmission of claim 8 wherein a seventh of the at least eight forward speed ratios is achieved by engagement of the first, second, and fourth torque transmitting mechanisms.

10. The transmission of claim 9 wherein an eighth of the at least eight forward speed ratios is achieved by engagement of the first, third, and fourth torque transmitting mechanisms.

11. The transmission of claim 1 wherein the third member of the first planetary gear set is continuously interconnected with the third member of the second planetary gear set, the second member of the second planetary gear set is continuously interconnected with a stationary element, the second member of the second planetary gear set is continuously interconnected with the first member of the first planetary gear set, and the first member of the third planetary gear set is continuously interconnected with the first member of the fourth planetary gear set.

12. The transmission of claim 1 wherein the first members are sun gears, the second members are carrier members, and the third members are ring gears.

13. The transmission of claim 1 wherein each of the torque transmitting mechanisms is engaged in at least five of the speed ratios.

14. A transmission comprising:
an input member;
an output member;
first, second, third, and fourth planetary gear sets each having sun, carrier, and ring members;
at least four continuous interconnections from at least one of the sun members, the carrier members, the ring members, and a stationary member to at least one other of the sun, carrier, and ring members;
a first torque transmitting mechanism selectively engageable to interconnect the input member with the sun member of the second planetary gear set;
a second torque transmitting mechanism selectively engageable to interconnect the ring member of the fourth planetary gear set with at least one of the ring member of the first planetary gear set and the ring member of the second planetary gear set;
a third torque transmitting mechanism selectively engageable to interconnect the carrier member of the first planetary gear set with the ring member of the fourth planetary gear set;
a fourth torque transmitting mechanism selectively engageable to interconnect the carrier member of the fourth planetary gear set with at least one of the ring member of the first planetary gear set and the ring member of the second planetary gear set; and
a fifth torque transmitting mechanism selectively engageable to interconnect the carrier member of the fourth planetary gear set with the ring member of the third planetary gear set, and
wherein a plurality of combinations of at least three engaged torque-transmitting mechanisms and at least two disengaged torque-transmitting mechanisms establish at least eight forward speed ratios and at least one reverse speed ratio between the input member and the output member.

15. The transmission of claim 14 wherein the first torque transmitting mechanism is engaged in at least a first, second, seventh, and eighth of the at least eight forward speed ratios and at least one of the at least one reverse speed ratio.

16. The transmission of claim 14 wherein the second torque transmitting mechanism is engaged in at least a first, third, fifth, sixth, and seventh of the at least eight forward speed ratios.

17. The transmission of claim 14 wherein the third torque transmitting mechanism is engaged in at least a second, third, fourth, sixth, and eighth of the at least eight forward speed ratios.

18. The transmission of claim 14 wherein the fourth torque transmitting mechanism is engaged in at least a fourth, fifth, sixth, seventh, and eighth of the at least eight forward speed ratios and at least one of the at least one reverse speed ratio.

19. The transmission of claim 14 wherein the fifth torque transmitting mechanism is engaged in at least a first, second, third, fourth, and fifth of the at least eight forward speed ratios and at least one of the at least one reverse speed ratio.

20. A transmission comprising:
an input member;
an output member;
first, second, third, and fourth planetary gear sets each having first, second, and third members, wherein the input member is interconnected with the second member of the third planetary gear set and the output member is interconnected with the third member of the third planetary gear set;

a selectively engaged reverse torque transfer path including the first member of the second planetary gear set interconnected with the input member and the third members of the first and second planetary gear sets interconnected with the second member of the fourth planetary gear set and the third member of the third planetary gear set;

a selectively engaged first torque transfer path including the first member of the second planetary gear set interconnected with the input member, the third members of the first and second planetary gear sets interconnected with the third member of the fourth planetary gear set, and the second member of the fourth planetary gear set interconnected with the third member of the third planetary gear set;

a selectively engaged second torque transfer path including the first member of the second planetary gear set interconnected with the input member, the third member of the fourth planetary gear set interconnected with the second member of the first planetary gear set, and the second member of the fourth planetary gear set interconnected with the third member of the third planetary gear set;

a selectively engaged third torque transfer path including the third members of the first and second planetary gear sets interconnected with the third member of the fourth planetary gear set and the second member of the first planetary gear set, and the second member of the fourth planetary gear set interconnected with third member of the third planetary gear set;

a selectively engaged fourth torque transfer path including the third members of the first and second planetary gear sets interconnected with the second member of the fourth planetary gear set and the third member of the third planetary gear set, and the second member of the first planetary gear set interconnected with the third member of the fourth planetary gear set;

a selectively engaged fifth torque transfer path including the third members of the first and second planetary gear sets interconnected with the second member of the fourth planetary gear set and the third member of the third and fourth planetary gear sets;

a selectively engaged sixth torque transfer path including the third members of the first and second planetary gear sets interconnected with the second member of the first planetary gear set and the second and third members of the fourth planetary gear set;

a selectively engaged seventh torque transfer path including the first member of the second planetary gear set interconnected with the input member, and the third members of the first and second planetary gear sets interconnected with the second and third members of the fourth planetary gear set; and a selectively engaged eighth torque transfer path including the first member of the second planetary gear set interconnected with the input member, the second member of the first planetary gear set interconnected with the third member of the fourth planetary gear set, and the third members of the first and second planetary gear sets interconnected with the second member of the fourth planetary gear set.

* * * * *